(12) United States Patent
Potkonjak et al.

(10) Patent No.: US 9,177,311 B2
(45) Date of Patent: *Nov. 3, 2015

(54) AUTHENTICATION OF FINANCIAL TRANSACTIONS VIA WIRELESS COMMUNICATION LINK

(71) Applicant: EMPIRE TECHNOLOGY DEVELOPMENT LLC, Wilmington, DE (US)

(72) Inventors: Miodrag Potkonjak, Los Angeles, CA (US); Nathan Beckmann, Cambridge, MA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,376

(22) Filed: Jun. 2, 2014

(65) Prior Publication Data

US 2014/0279547 A1    Sep. 18, 2014

Related U.S. Application Data (63) Continuation of application No. 13/941,853, filed on Jul. 15, 2013, now Pat. No. 8,744,429, which is a continuation of application No. 12/415,027, filed on Mar. 31, 2009, now Pat. No. 8,532,642.

(51) Int. Cl.
| | |
|---|---|
| *H04M 1/66* | (2006.01) |
| *G06Q 20/32* | (2012.01) |
| *H04L 29/08* | (2006.01) |
| *H04W 4/16* | (2009.01) |
| *H04M 1/663* | (2006.01) |
| *H04M 1/725* | (2006.01) |

(Continued)

(52) U.S. Cl.
CPC ............ *G06Q 20/3224* (2013.01); *H04L 67/16* (2013.01); *H04M 1/72569* (2013.01); *H04W 4/16* (2013.01); *H04M 1/663* (2013.01); *H04M 1/72552* (2013.01); *H04W 8/22* (2013.01); *H04W 88/182* (2013.01)

(58) Field of Classification Search
CPC ....... H04W 88/184; H04W 4/12; H04W 4/14; H04W 12/06; H04W 12/08; H04W 12/12
USPC ........... 455/419, 425, 466, 404.2, 556.1, 456, 455/410, 411; 701/2, 3
See application file for complete search history.

(56) References Cited

U.S. PATENT DOCUMENTS

| | | |
|---|---|---|
| 2003/0138092 A1 | 7/2003 | Maekiniemi et al. |
| 2004/0092250 A1 | 5/2004 | Valloppillil |

(Continued)

OTHER PUBLICATIONS

Lucy A. Suchman, "Plans and Situated Actions: The Problem of Human-Machine Communication," XEROX PARC. ISL-6. Feb. 1985, 162pgs.

(Continued)

*Primary Examiner* — Temica M. Beamer
(74) *Attorney, Agent, or Firm* — Brundidge & Stanger, P.C.

(57) ABSTRACT

Examples include autonomously authenticating a financial transaction, on behalf of the user, without interacting with the user, via wireless communication link. In various embodiments, the user's cellular phone may be configured to process a message that provides at least partial service context and autonomously authenticate the financial transaction.

30 Claims, 5 Drawing Sheets (51) Int. Cl.
*H04W 8/22* (2009.01)
*H04W 88/18* (2009.01)

(56) References Cited

U.S. PATENT DOCUMENTS

| | | |
|---|---|---|
| 2005/0047562 A1 | 3/2005 | Holz et al. |
| 2006/0079215 A1 | 4/2006 | Perrella et al. |
| 2006/0135138 A1 | 6/2006 | Lazaridis |
| 2006/0205393 A1 | 9/2006 | Veen |
| 2007/0032224 A1 | 2/2007 | Boyer et al. |
| 2008/0198018 A1 | 8/2008 | Hartley |
| 2008/0292074 A1 | 11/2008 | Boni et al. |
| 2008/0305814 A1 | 12/2008 | Deng et al. |

OTHER PUBLICATIONS

Shoham. Y, "Agent-Oriented Programming,"Journal of Artificial Intelligence, 1994.

Yoav Shoham, "An Overview of Agent-Oriented Programming" Software Agents, Chapter 13, pp. 271-290. AAAI Press, Apr. 18, 1997.

Kenneth P. Fishkin, "A taxonomy for and analysis of tangible interfaces" Pers Ubiquit Comput (2004) 8: 347-358.

Helen Cole and Danae Stanton, "Designing mobile technologies to support co-present collaboration" Pers Ubiquit Comput (2003) 7: 365-371.

Antti Oulasvirta and Antti Salovaara, "A Cognitive Meta-Analysis of Design Approaches to Interruptions in Intelligent Environments" pp. 1155-1158, CHI 2004, Late Breaking Results Paper.

Genevieve Bell and Paul Dourish, "Yesterday's tomorrows: notes on ubiquitous computing's dominant vision" Pers Ubiquit Comput (2006).

Mark Weiser, "Creating the Invisible Interface (Invited Talk)" Abstract, UIST Nov. 2-4, 1994.

Antti Oulasvirta adn Lauri Sumari, "Mobile Kits and Laptop Trays: Managing Multiple Devices in Mobile Information Work" CHI 2007, Apr. 28-May 3, 2007.

600 A computer program product

632 A computer readable storage medium

634 At least one of:

one or more instructions for collecting data about a user of a cellular phone, internal conditions of the phone, or external environment of the phone;
one or more instructions for determining a service context, upon receipt of a call or message; or
one or more instructions for autonomously servicing the call/message, based at least in part on the determined service context.

FIGURE 6

AUTHENTICATION OF FINANCIAL TRANSACTIONS VIA WIRELESS COMMUNICATION LINK

CROSS-REFERENCE TO RELATED APPLICATIONS

This application is a continuation under 35 U.S.C. §120 of U.S. application Ser. No. 13/941,853, filed on Jul. 15, 2013, now U.S. Pat. No. 8,744,429, which is a continuation under 35 U.S.C. §120 of U.S. application Ser. No. 12/415,027, filed Mar. 31, 2009, now U.S. Pat. No. 8,532,642.

TECHNICAL FIELD

Embodiments of the present disclosure relate to cellular phones, and more particularly, to autonomous, non-interactive context-based services (beyond traditional telephony and personal information management applications) on a cellular phone.

BACKGROUND

Cellular phones have achieved amazing market penetration worldwide, and have become commonplace in modern life. This trend has pushed manufacturers to increase the capabilities of these devices. In their current form, services provided by the cellular phone generally require explicit interaction with the user.

BRIEF DESCRIPTION OF THE DRAWINGS

Embodiments of the present disclosure will be readily understood by the following detailed description in conjunction with the accompanying drawings and the appended claims. To facilitate this description, like reference numerals designate like structural elements. Embodiments of the disclosure are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent. Moreover, some embodiments may include more or fewer operations than may be described.

The description may use the phrases "in an embodiment," "in embodiments," "in some embodiments," or "in various embodiments," which may each refer to one or more of the same or different embodiments. Furthermore, the terms "comprising," "including," "having," and the like, as used with respect to embodiments of the present disclosure, are synonymous, and are generally intended as "open" terms (e.g., the term "including" should be interpreted as "including but not limited to," the term "having" should be interpreted as "having at least," the term "includes" should be interpreted as "includes but is not limited to," etc.).

As used herein, "coupled," along with its derivatives, may mean one or more of the following. "Coupled" may mean a direct physical or electrical coupling or connection, wherein there is no other element coupled or connected between the elements that are said to be coupled with each other. "Coupled" may also mean an indirect physical or electrical coupling or connection, where one or more other elements are coupled or connected between the elements that are said to be coupled with each other.

For the purposes of the present disclosure, the phrase "A/B" means A or B. The phrase "A and/or B" means "(A), (B), or (A and B)." The phrase "at least one of A, B, and C" means "(A), (B), (C), (A and B), (A and C), (B and C), or (A, B and C)." The phrase "(A)B" means "(B) or (AB)," that is, A is an optional element. In addition, although embodiments of the present disclosure may be shown and described as including a particular number of components or elements, embodiments of the disclosure are not limited to any particular number of components or elements.

Figure 1:
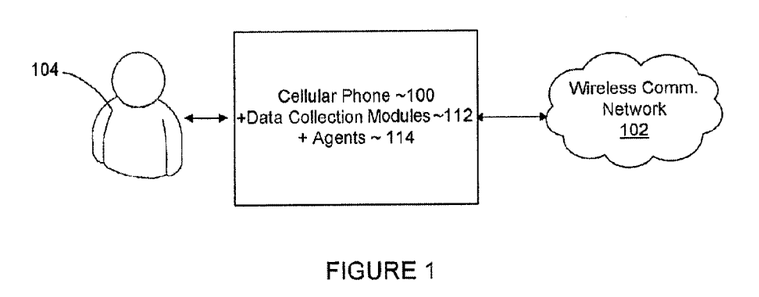
FIG. 1 illustrates an overview of a cellular phone with autonomous service, in accordance with various embodiments.

Turning now to FIG. 1, illustrated is an overview of a cellular phone with autonomous service in accordance with various embodiments. For the embodiments and as shown, cellular phone 100, incorporated with the teachings of the present disclosure, may be coupled with a network 102, e.g., the Internet. Cellular phone 100 may be designed to provide autonomous service to increase the amount of functions performed for user 104. Autonomous services refer to services provided by cellular phone 100 for user 104, without interaction with or intervention by user 104. Although in minority or exception situations, user interaction or intervention may be requested. As will be described in more detail below, in various embodiments, autonomous services are performed based at least in part on dynamically determined service contexts.

For the embodiments, cellular phone 100 may include a number of data collection modules 112. In various embodiments, data collection modules 112 may be configured to collect and store data about user 104, internal operating conditions of cellular phone 100, and/or external environment of cellular phone 100. In various embodiments, data collection modules 112 may collect the data locally (e.g., through local monitoring and/or sensing), as well as from the Internet, thereby significantly broadening the repertoire of data available to support the variety of autonomous services provided as well as enhancing the precision of the autonomous services provided.

Cellular phone 100, as illustrated, may further include a number of agents 114 configured to perform a number of services for user 104 autonomously, in particular, services for servicing various calls or messages received. Calls may be transmitted to cellular phone 100 via any one of a number of wireless communication protocols, including but not limited to Code Division Multiple Access (CDMA), Global System for Mobile Communication (GSM) and so forth. Messages may be conventional text, email, short messaging service (SMS) or multi-media messaging service (MMS) messages. A message may include a request, e.g., a request to authorize a transaction or approval an action. A message may also report a status of a device or an occurrence of an event.

For some example embodiments, each of agents 114 may be configured to determine, on receipt of a call or a message to be autonomously serviced, a service context, based at least in part on some of the data collected and stored about the user, the internal conditions and the external environment. Examples of a service context may include but are not limited to the user 104 being at home, the user 104 being work, the user 104 being busy, the user 104 being available, battery being low, signal being weak, processor being busy, storage being full, external temperature being cold, humidity being high, and so forth. Further, each of agents 114 may be configured to autonomously service the received call or message, without interaction with the user 104 or substantially without interactions with the user 104, based at least in part on the determined service context.

Figure 2:
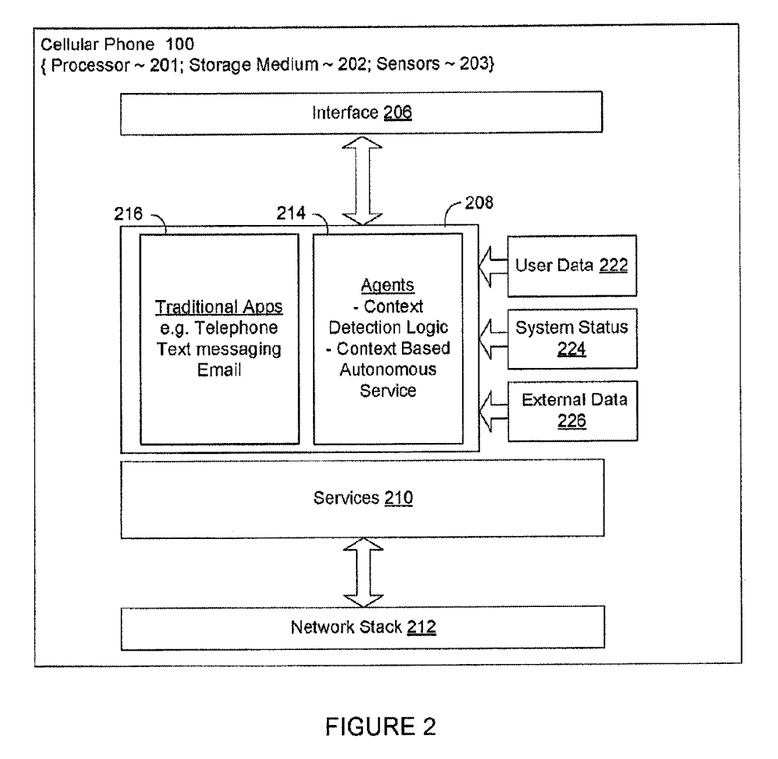
FIG. 2 is a block diagram of the cellular phone of FIG. 1 in further details, in accordance with various embodiments.

FIG. 2 is a block diagram of cellular phone 100 of FIG. 1 in further detail, in accordance with various embodiments. As shown, the example architecture of the cellular phone 100 may include one or more of a user interface 206, an application layer 208, data collection and provision modules 222-226, a services layer 210, and a network stack 212. The various interfaces, layers and modules may be implemented by executable instructions stored in various storage media 202, or executed by one or more processors 201. Storage medium 202 may be of various types, including but not limited to, e.g., non-volatile memory, such as flash memory. Processor 201 may be of various types also, including but not limited to, e.g., reduced instruction set computer (RISC) processors.

User interface 206 may be configured to support one or more user input and/or output devices through which a user may input commands and data or observe output information. Such devices may include a display device, a speaker, a microphone, a keyboard, a pointing device (e.g., a mouse, a trackball, or a touch pad), or the like.

Cellular phone 100 may be coupled to the network 102 using the network stack 212. The network stack 212 may be primarily concerned with networking details for coupling the cellular phone 100 to a wireless network. The network stack 212 may be configured to couple the cellular phone 100 to a wireless wide area network (WWAN) or a wireless local area network (WLAN) that may provide access to a broadband network such as the Internet.

The application layer 208 may include agent applications 214 as well as various traditional applications 216 such as, telephone application, text messaging application, or e-mail application. The agent applications (or simply agents) 214 may be configured to service a received call or message on behalf of the user, autonomously, without interaction with the user, or substantially without interaction with the user.

The agents 214 may be designed to determine the service context, on receipt of a call or message to be autonomously serviced. As described earlier, each agent 214 may be configured to determine the service context, on receipt of a call or message to be serviced, based at least in part on some of the data 222 collected about a user, internal operating conditions (system status) 224, and external environment 226. Further, each agent application 214 may be configured to thereafter autonomously service the received call or message, based at least in part on the determined service context.

As described earlier, cellular phone 100 may employ a number of data collection modules 112 to collect and store the data 222 about the user, the internal operating conditions (also may be referred to as "system status") 224, and the external environment (also may be referred to as "External Data") 226, and the collection may be locally and from the Internet. In various embodiments, cellular phone 100 may be provided with one or more sensors 203 in assisting in the local collection of data 222 about the user (User Data), internal operating conditions 224 (System Status), and/or external environment 226 (External Data).

In some embodiments, collecting and storing data 222 about the user may include one or more of collecting and storing data about the user's current context, e.g., whether the user is at home, at work, or neither, the user's current status, e.g., whether the user is busy or available, the user's calendar, the user's contacts, the user's to-dos, and so forth. Collecting and storing data about internal operating conditions may include collecting and storing data about one or more of the cellular phone's power, memory availability, storage availability, CPU utilization, and so forth. Collecting and storing data about the external environment may comprise collecting and storing data about one or more of the cellular phone's current geographical location, signal strength, signal interference, external temperature, external humidity, and so forth.

For some embodiments, cellular phone 100 may further include a common service layer 210 (Services) located in between the network stack 212 and the application layer 208. The services layer 210 may be configured to be a gateway between the network and applications operating on cellular phone 100, including agents 214 configured to autonomously perform services for the user. The services layer 210 may also be configured to route a received call or message to one of the applications 214-216 in application layer 208 to process or service. In various embodiments, service layer 210 may also be designed to perform additional services including, for example, voicemail recording, smart filtering of unwanted communication, or the like.

In various embodiments, agents 214 may be programmed with decision logic (or decision logic trees) of varying levels of complexity. For example, a decision logic may be to simply ignore, forward, or route all calls to voicemail when the user is at work. The decision logic may be refined such that all calls are ignored, forwarded, or routed to voicemail when the user is at work except if those calls are from a certain person or if the user is at her desk versus in a meeting. The decision logic may be broadly categorized into "contexts" (e.g., work, home, vacation, etc.), which may be triggered in certain conditions.

In various embodiments, the agents 214 may be explicitly and/or implicitly programmed to autonomously service a call or a message. Explicit programming may entail explicitly specifying the desired behaviors and the conditions for triggering the desired behaviors. To that end, the cellular phone 100 may be endowed with a graphical user interface (GUI) or the like to facilitate the programming interaction. In various embodiments, another computing apparatus may be explicitly programmed with the desired behaviors and then the cellular phone 100 may be synchronized with the other computing apparatus.

Additionally or alternatively, agents 214 may be implicitly programmed to provide the autonomous services. Implicit programming may involve passive learning by the agents 214 in which a user's behavior is observed by the agents 214 and/or by explicit hints provided by the user. An example of passive learning could be a situation in which the agents 214 has an alarm function and it is observed that the user only uses the alarm on weekdays and turns off the alarm function on weekends. In this example, agents 214 may learn to turn the alarm function off on weekends on its own, without requiring the user to explicitly set the conditions. In some embodiments, behavior may be adapted in some embodiments only after a degree of certainty has been achieved (e.g., more than one or two actions may be required before it is considered a "behavior").

In various embodiments, agents 214 may be configured to record the autonomous services provided into a log, and the log may be periodically submitted to an external analysis service for analysis and to provide feedback to the agents. In turn, agents may self-modify their processes in determining the current service context or self-modify the manner in which a call or message is autonomously serviced based at least in part on a determined service context. In various embodiments, agents 214 may be configured to self-modify current service context determination and/or autonomous service based on a determined service context periodically.

Figure 3:
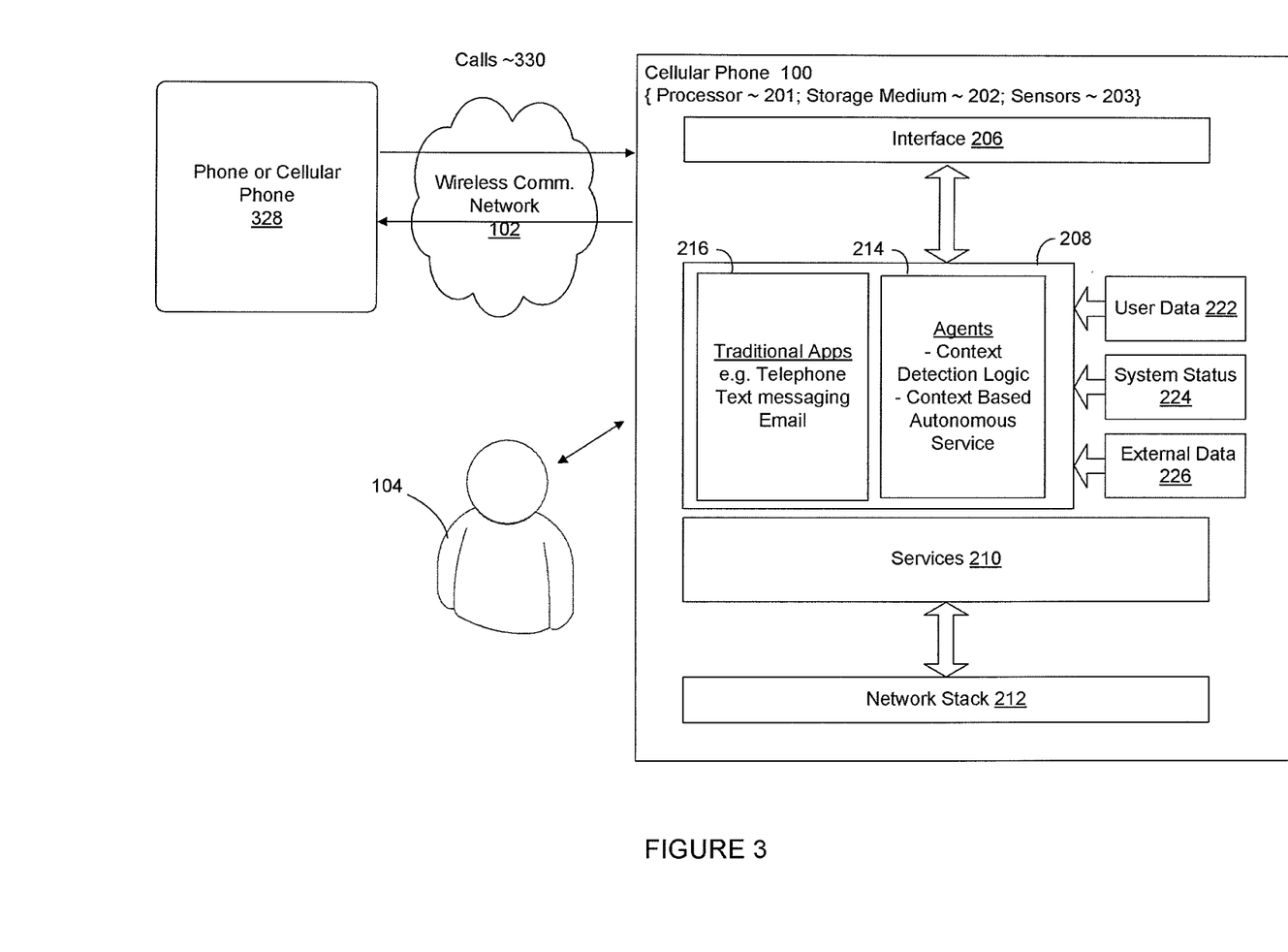
FIG. 3 illustrates various examples of autonomous servicing of a call, in accordance with various embodiments.

FIG. 3 illustrates various examples of autonomous servicing of a call of various embodiments. As illustrated, cellular phone 100 may receive a call 330 through the wireless communication network 102 from another phone 328, which may be another cellular phone. On receipt of the call 330, if not filtered, e.g., because it is not a marketing call, service layer 210 may route the call 330 to one of the agents 214 (as opposed to the traditional telephone application 216). On receipt of the call 330, the agent 214 may determine the service context at the time, based at least in part on some of the data collected and stored about the user, the internal operating conditions and/or the external environment. Thereafter, the agent 214 may autonomously service the call 330 e.g., by letting the call 330 ring through, routing the call 330 to the traditional telephone application 216, routing the call 330 to a voice message service (not shown), and so forth.

In various embodiments, cellular phone 100 may receive multiple calls 330 from multiple other phones 328 at the same time. For these embodiments, upon having routed the calls 330 by common service layer 210, agent 214 may determine the service context by determining the callers, the relative priority of the callers, based at least in part on some of the data collected and stored about the user, the internal operating conditions and/or external environment. Thereafter, agent 214 may route or otherwise dispose the various calls 330 based at least in part on the determined service context. For example, when one of the callers is determined to be the boss of the user, and having priority over all other calls, the boss' call may be allowed to automatically cut in, replacing a lower priority current call, which may be put on hold.

Figure 4:
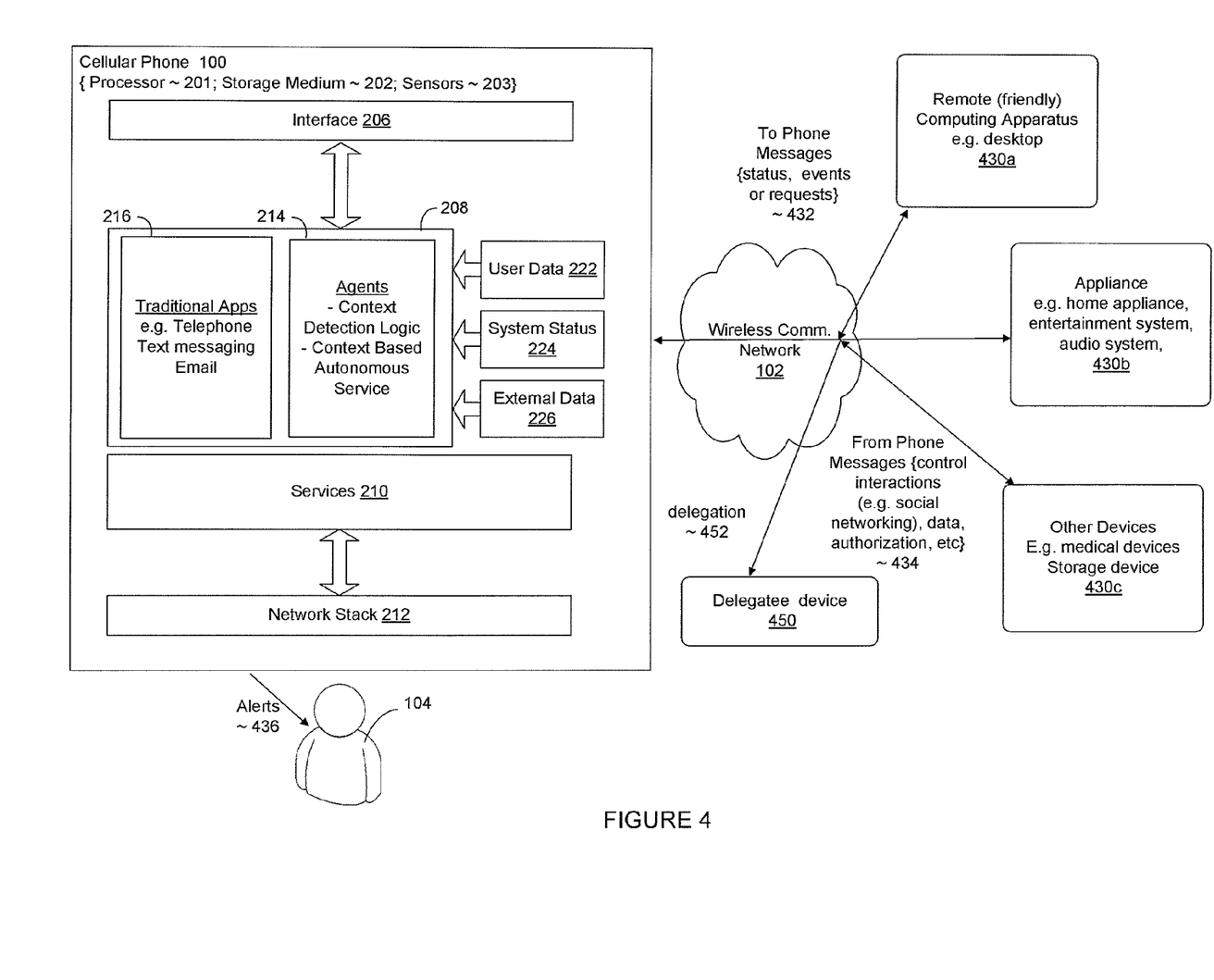
FIG. 4 illustrates various examples of autonomous servicing of messages, in accordance with various embodiments.

FIG. 4 illustrates various examples of autonomous servicing of messages of various embodiments. As illustrated, cellular phone 100 may receive a message 432 from a remote computing apparatus 430*a*, an appliance 430*b*, or a device 430*c* of another type. The remote computing apparatus 430*a* may comprise a mobile electronic device such as, but not limited to, a mobile phone, a laptop computer, or a personal digital assistant, or a substantially stationary computing apparatus, such as a server, a desktop computer or the like. In various embodiments, the remote appliance 430*b* may comprise a home appliance, an entertainment or gaming system, or an audio system. In various embodiments, the home appliance 430*b* may comprise, but not limited to, a range/oven, a dishwasher, a washer, a dryer, heating/ventilation/cooling system, or the like. In various embodiments, device 430*c* may comprise a medical device, a storage device and so forth.

As described earlier, the message 432, sent from one of the remote computing apparatus 430*a*, appliance 430*b* or device 430*c* of another type (hereinafter, may be referred to collectively as "remote apparatus") may be a conventional communication message, or a message reporting the status of a device or occurrence of an event. The device may be the message sending apparatus itself. Similarly, upon having been routed the message 432 by common service layer 210, agent 214 may determine the service context, based at least in part on some of the data collected and stored about the user, the internal operating conditions and/or external environment. Thereafter, agent 214 may autonomously service the message 432, based at least in part on the determined service context.

The interaction with the remote apparatus may include, but is not limited to, an agent 214 monitoring, controlling, obtaining information from, managing data, or otherwise interacting (e.g., receiving and/or transmitting data) with the remote apparatus. In some embodiments, the remote apparatus may be monitored and data may be collected regarding the monitoring and/or the user 104 of cellular phone 100 may be alerted or interrupted in some manner conditioned on the occurrence of an event on the user's cellular phone 100. The alerts 436 may be conveyed visually, e.g., through blinking lights, audibly, e.g., through audio beeps or other means. In various embodiments, controlling of the remote apparatus may be conditioned on the occurrence of an event on the user's cellular phone 100.

In some embodiments, for example, the remote appliance 430*b* may comprise a home appliance or an entertainment system, alarm, while the other device 430*c* may comprise a medical device, which may be monitored and/or controlled by the user's cellular phone 100. For example, the user's cellular phone 100 may autonomously monitor a medical device 430*c* (e.g., a pacemaker, a glucose monitor, etc.). The user's cellular phone 100 may be further configured to send a message 434 to control the medical device 430*c* to perform some action in response to some condition (e.g., alert the user 104 if heartbeat or glucose readings are abnormal).

As noted herein, apparatuses, systems, and methods for autonomous service on a cellular phone may be integrated into a work-flow, perhaps in an office-type environment. In some of these embodiments, incoming requests received on the cellular phone 100 (e.g., by email, text, etc.) may be autonomously delegated 452 to another entity or device 450, sometimes on the basis of recent or long-term activity efforts. The delegation 452 may be addressed in a way, due to heuristic rules or statistical models, to facilitate work objectives. This may allow the user 104 to save time in explicitly reading the request and then delegating it out. This may also allow work to be performed more quickly in that the work may be immediately delegated instead of being contingent on some intervention by the user 104.

In an example, the cellular phone 100 may be part of an infrastructure in which information may be exchanged between various appliances 430*b* and cellular phone 100, which may allow coordination between the appliances 430*b* and cellular phone 100. For example, a message 434 including a command may be issued by the cellular phone 100 to instruct an audio system 430*b* within the infrastructure to reduce in volume or mute in response to an incoming call to the cellular phone 100.

Autonomous service on cellular phone 100 may be used for various social networking applications. In particular, the user's cellular phone 100 may be configured to determine the status of the remote computing apparatus 430a and take some action for facilitating social networking between the user's cellular phone 100 and the remote computing apparatus 430a (presumably a "friendly" computing apparatus). In some embodiments, the user's cellular phone 100 may be configured to detect a stimulus including a request from the remote computing apparatus 430a and take some action for facilitating social networking between the user's cellular phone 100 and the remote computing apparatus 430a (e.g., providing a message 434 having information regarding the location or status or the user 104).

In various embodiments, the user's cellular phone 100 may determine whether the remote device 430c is located nearby, and if so, may alert the user 104. In some embodiments, the user's cellular phone 100 may determine a calendar schedule of the user of the remote device 430c and store data regarding the calendar schedule on the user's cellular phone 100. In still further embodiments, the user's cellular phone 100 may alert (e.g., by text messaging 434) the user of the remote device 430c that the user 104 is nearby.

Autonomous service on cellular phone 100 and interaction with the remote apparatus, appliance or device 430a-430c may be used for management of data stored on the user's cellular phone 100. Data management may include storing or backing-up of data from the user's cellular phone 100 onto the remote device 430c. In various ones of these embodiments, for example, the user's cellular phone 100 automatically determines (via one of the agents 214 running in the background on the cellular phone 100) that the user's cellular phone 100 has data to be backed up or has data for storing onto the remote device 430c. The user's cellular phone 100 may proceed with the backing up of the data from the cellular phone 100 onto the remote device 430c by sending messages 434 containing the data to be backed up to remote device 430c. In some embodiments, the backing up of data may be limited to when the user's cellular phone 100 and the remote device 430c are within a specified proximity.

In a specific example, a cellular phone 100 with a digital camera interface may be configured via an agent 214 to detect when the cellular phone 100 is within a close proximity of a remote computing apparatus 430a (e.g. a desktop computer) and automatically backup the stored digital pictures on the desktop computer 430a. In this specific example, the cellular phone 100 identifies a contextual awareness of the environment (e.g., context="near desktop computer"), and autonomously downloads (or backs up) the digital picture data based on the identified context.

Further examples of tasks that may be performed autonomously may include the handling or smart filtering of incoming emails, calls, or text messages (e.g., by service 210). Incoming emails or text messages from the remote apparatus, appliance or device 430a-430c may be automatically forwarded, ignored, or prioritized without any awareness from the user 104, using agents 214 and/or services 210.

In various embodiments, the cellular phone 100 may be configured to receive or retrieve data from the remote computing apparatus, 430a-430c or some other source external to the user's cellular phone 100, and interrupt the cellular phone 100 or alert 436 the user 104 based at least in part on the content of the data. Whether the user 104 is alerted or the cellular phone 100 is interrupted from its current process(es) may depend at least in part on the occurrence of a condition, indicated by the content of the data. In various embodiments, for example, the cellular phone 100 may be configured to receive or retrieve data on stocks, news, or weather. The cellular phone 100 may autonomously analyze the data, and in embodiments, may also autonomously store the data. If the content of the data meets some condition (e.g., a certain stock price, certain keywords of a news item, certain types of weather, etc.), the cellular phone 100 may then interrupt alert the user 104 or interrupt its current process(es).

In various embodiments, agents 214 of cellular phone 100 may be configured e.g. with one or more agents 214 having security features to reduce the risk of unfriendly reverse engineering or successfully predicting the action of the cellular phone 100. Accordingly, in various embodiments, the autonomous services performed by an agent 214 with security features may be randomized (within a valid set) such that their prediction may be made more difficult.

Various embodiments described herein may find application for validating or authenticating various activities. For example, credit card or automatic teller machine transactions may be authenticated in accordance with various embodiments. The ignition system of a motor vehicle may similarly require authentication prior to allowing starting up of the motor vehicle. Various electronic devices may be similarly configured to require the provision of authenticating information for access thereto.

In these embodiments, the remote computing apparatus 430a may comprise an authenticating computing apparatus configured to receive or retrieve over the network 102 a request for an action to occur at a first location (e.g., the motor vehicle's location, the vendor's location, etc.). The authenticating computing apparatus 430a may be configured to provide a request for authentication information to the user's cellular phone 100, located at a second location. The authenticating computing apparatus 430a may be configured to prevent or disallow the requested action to occur until valid authentication information is received from the user's cellular phone 100.

The user's cellular phone 100, upon receipt of the authentication request, may provide the requested authentication information to the authenticating computing apparatus 430a. In various embodiments, the authentication information may be information regarding the location of the user's cellular phone 100 (e.g., coordinates, address, etc.). As noted herein, the location of the user's cellular phone 100 may, by extension, provide information as to the location of the user 104. As certain requested actions would require the first location (location for the requested action to occur) and the second location (the location of the user's cellular phone 100/user 104) to be substantially the same location, providing this location information as the authentication information may be sufficiently authenticating.

For example, if a request is received for a credit card transaction to occur at a store at a particular address, it is usually safe to assume that the user 104 would be at the store along with the user's cellular phone 100. Similarly, if a request is received to start up the user's motor vehicle at a particular location, it is usually safe to assume that the user 104 would be at that motor vehicle along with the user's cellular phone 100.

The authenticating computing apparatus 430a may receive or retrieve the authentication information from the user's cellular phone 100 to verify the requested action, and then facilitate the performance of the requested action based at least in part on the authentication information. Facilitation of the requested action may include permitting the requested action to proceed (e.g., if the first location and the second location are substantially the same location). The requested action may, on the other hand, be disallowed if the authentication information is not valid (e.g., the first location and the second location are substantially different locations). In this case, a further action may include alerting the user 104 to notify the user of the requested action and/or requesting the user 104 to take some action to affirmatively authenticate the request action. The further authentication may include, but is not limited to, requesting the user to call the credit card company to provide some indication of approval of the action (e.g., a personal identification number, voice recognition, etc.)

Figure 5:
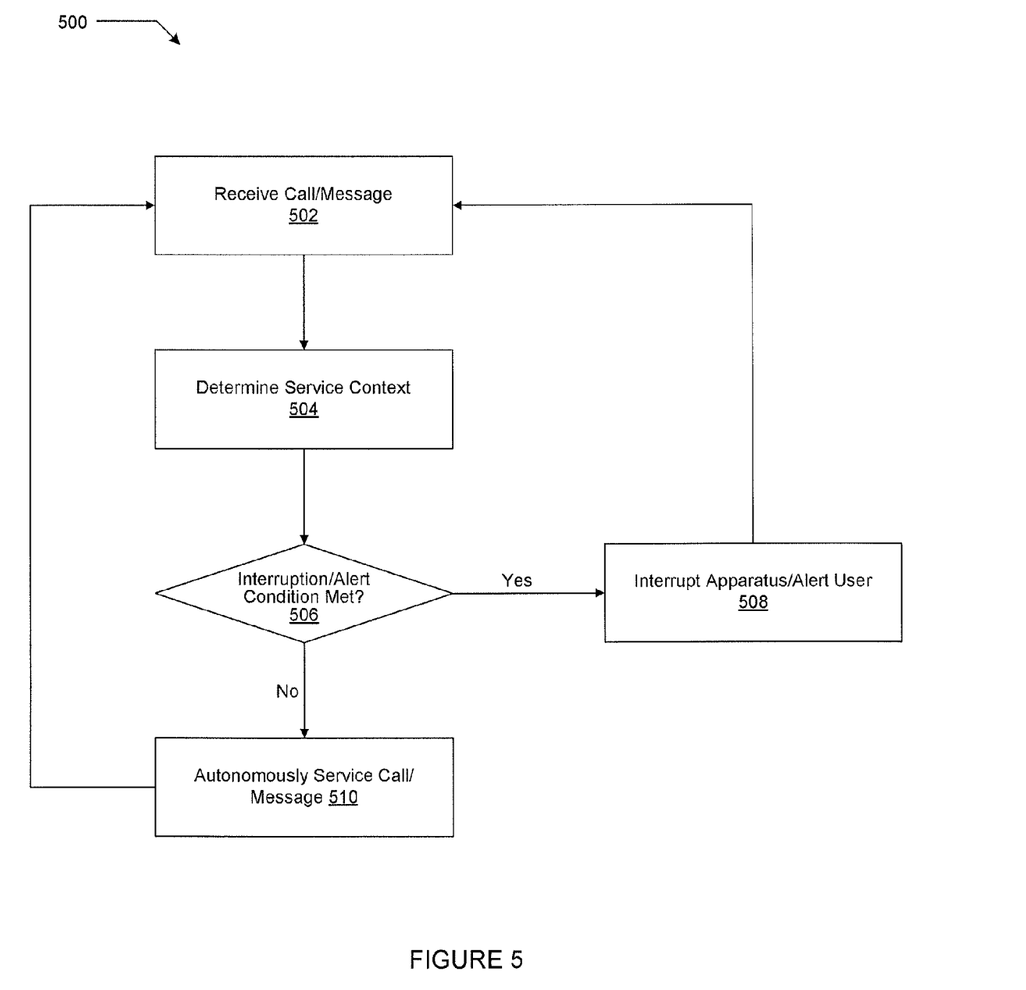
FIG. 5 is a flowchart illustrating a method of autonomous service on a cellular phone, in accordance with various embodiments.

FIG. 5 is a flowchart illustrating a method 500 of autonomous service on a cellular phone, in accordance with various embodiments. A call or message may be received at block 502. A message may comprise a request, e.g., a request to authorize a transaction, approve an action, and so forth, or a report, reporting e.g., a status of a device, an occurrence of an event, and so forth.

A service context may be determined at block 504. The service context may be determined based at least in part on some of the data collected and stored, about the user, the internal conditions of the cellular phone, and/or the external environment.

At block 506, a decision may be made whether to interrupt or alert the user, or to autonomously service the call or message. If it is determined that the user should be interrupted or alerted, the user may be interrupted or alerted accordingly at block 508. The interruption or alert may be performed in any one of a number of manners, via pop up messages, blinking lights, one or more audio beeps, vibration and so forth. On the other hand, if it is determined that the user should not be interrupted or alerted, the call or message may autonomously be serviced at block 510, without interaction with the user, based at least in part on the determined current service context.

Computer program products and/or systems may be employed to enable performance of one or more methods as disclosed herein. For example, a computer program product may be adapted to enable a cellular phone to perform autonomous service on behalf of a user.

Figure 6:
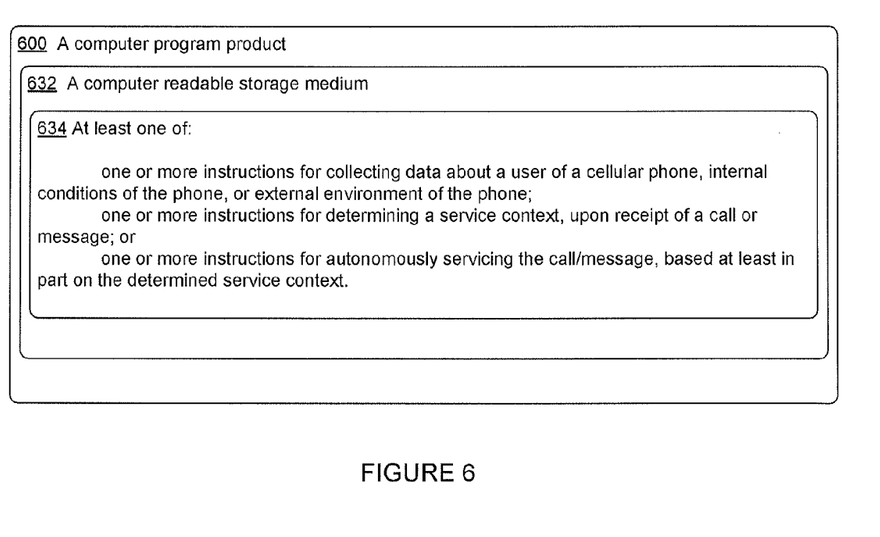
FIG. 6 is a block diagram of a computer program product with instructions for providing autonomous service on a cellular phone, in accordance with various embodiments.

FIG. 6 is a block diagram of a computer program product 600 with instructions for providing autonomous service on a cellular phone, in accordance with various embodiments. The example computer program product 600 may comprise a computer readable storage medium 632 and a plurality of programming instructions 634 stored in the computer readable medium 632. In various ones of these embodiments, the programming instructions 634 may be adapted to program a cellular phone to enable the cellular phone to collect data about a user of the cellular phone, internal operating conditions of the cellular phone, and/or external environment of the cellular phone. The collection may be collected locally as well as from the Internet. The instructions 634 may also enable the cellular phone to determine, on receipt of a call or a message, a current service context, based at least in part on some of the data collected and stored. Further, the instructions 634 may also enable the cellular phone to autonomously service the received call or message, without interacting with the user, based at least in part on the determined service context.

Embodiments may have some or all of the instructions depicted in FIG. 6. Embodiments of computer program product 600 may have other instructions in accordance with embodiments described herein. The computer readable medium 632 may take a variety of forms including, but not limited to, volatile and persistent memory, such as, but not limited to, a compact disc (CD), a digital versatile disc (DVD), a solid-state drive, a hard drive, and so forth. Embodiments are not limited to any type or types of computer program products.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described 12 herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disc (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although the present disclosure has been described in terms of the above-illustrated embodiments, it will be appreciated by those of ordinary skill in the art that a wide variety of alternate and/or equivalent implementations calculated to achieve the same purposes may be substituted for the embodiments shown and described without departing from the scope of the present disclosure. Those with skill in the art will readily appreciate that embodiments in accordance with the present disclosure may be implemented in a very wide variety of embodiments. This description is intended to be regarded as illustrative instead of restrictive.

What is claimed:

1. A method to authenticate a financial transaction, comprising:
   receiving, by a computing apparatus, a first request for a financial transaction;
   transmitting, by the computing apparatus, a wireless message, to a mobile device, requesting information for authenticating the financial transaction,
   wherein the wireless message is configured by the computing apparatus to be managed by the mobile device based at least in part on a service context that includes at least one of a current geographical location of the mobile device or a geographical location of the financial transaction, and that is based on one or more of a user of the mobile device, an internal operating condition of the mobile device, or an external environment of the mobile device;
   receiving, by the computing apparatus from the mobile device, authentication information associated with authenticating the financial transaction; and
   facilitating, by the computing apparatus, authentication of the financial transaction based on the received information.

2. The method of claim 1, wherein the financial transaction includes one of a point-of-sale transaction, an ATM transaction, or an electronic transfer of funds.

3. A non-transitory computer-readable medium storing executable instructions that, if executed, cause a computing device to perform operations regarding a financial transaction comprising:
   transmitting, for reception by a mobile device via wireless communication, a message that includes a request for information regarding a financial transaction;
   causing conditioned activation of autonomous servicing of the received message by the mobile device based at least in part on a service context,
   wherein the service context includes at least one of a current geographical location of the mobile device or a geographical location of the financial transaction, and
   wherein further the service context is based on data including one or more of data about a user of the mobile device, data about an internal operating condition of the mobile device, or data about an external environment of the mobile device; and
   determining whether to authenticate the financial transaction.

4. The non-transitory computer-readable medium of claim 3, wherein the financial transaction includes one of a point-of-sale transaction, an ATM transaction, or an electronic transfer of funds.

5. A method comprising:
   receiving, by a computing apparatus, a request associated with a proposed financial transaction;
   providing, by the computing apparatus, for a mobile device via wireless communication, a message serving as a request for information related to facilitating the proposed financial transaction;
   causing, by the computing apparatus, the request for information to be conditionally handled by autonomous servicing of the message by the mobile device based at least in part on a service context of the mobile device, the information related to facilitating the proposed financial transaction being based at least in part on the conditioned autonomous servicing of the message;
   receiving, by the computing apparatus from the mobile device, a response to the providing of the message, the response including the information related to facilitating the proposed financial transaction; and
   providing, by the computing apparatus, based on the information related to facilitating the proposed financial transaction, a response to the request associated with the proposed financial transaction.

6. The method of claim 5, wherein providing a response to the request associated with the proposed financial transaction excludes disallowing the proposed financial transaction.

7. The method of claim 5, wherein providing a response to the request associated with the proposed financial transaction includes facilitating, by the computing apparatus, the proposed financial transaction.

8. The method of claim 5, wherein providing a response to the request associated with the proposed financial transaction includes disallowing, by the computing apparatus, the proposed financial transaction.

9. The method of claim 5, wherein providing a response to the request associated with the proposed financial transaction includes providing, by the computing apparatus, the response to an apparatus that is not the mobile device.

10. The method of claim 5, wherein the service context includes at least one of a current geographical location of the mobile device or a geographical location of the financial transaction, and is based on one or more of a user of the mobile device, an internal operating condition of the mobile device, or an external environment of the mobile device.

11. The method of claim 5, wherein the information related to facilitating the proposed financial transaction includes information authenticating a user of the mobile device as an authorized party to the financial transaction.

12. The method of claim 5, wherein the information related to facilitating the proposed financial transaction includes information authenticating the mobile device as an authorized transacting element in the financial transaction.

13. The method of claim 5, wherein the request associated with a proposed financial transaction is received by the computing apparatus remotely from a source of the request.

14. The method of claim 13, wherein the source of the request is not the mobile device.

15. The method of claim 5, wherein the proposed financial transaction includes one of a point-of-sale transaction, an ATM transaction, or an electronic transfer of funds.

16. A non-transitory computer-readable medium storing executable instructions that, if executed, cause a computing device to perform operations comprising:

providing, for a mobile device via wireless communication, a message serving as a request for information related to facilitating a proposed financial transaction;

causing conditioned activation of autonomous servicing of the message by the mobile device to conditionally handle the request for information based at least in part on a service context of the mobile device, the information related to facilitating the proposed financial transaction being based at least in part on the conditioned autonomous servicing of the message;

determining, based on the information related to facilitating the proposed financial transaction having been received from the mobile device, whether to facilitate the proposed financial transaction.

17. The non-transitory computer-readable medium of claim 16, wherein the executable instructions, if executed, cause the computing device to perform a further operation comprising providing, pursuant to the determining, a communication that excludes disallowing the proposed financial transaction.

18. The non-transitory computer-readable medium of claim 16, wherein the executable instructions, if executed, cause the computing device to perform a further operation comprising providing, pursuant to the determining, a communication that includes facilitating the proposed financial transaction.

19. The non-transitory computer-readable medium of claim 16, wherein the executable instructions, if executed, cause the computing device to perform a further operation comprising providing, pursuant to the determining, a communication that includes disallowing the proposed financial transaction.

20. The non-transitory computer-readable medium of claim 16, wherein the service context includes at least one of a current geographical location of the mobile device or a geographical location of the financial transaction, and is based on one or more of a user of the mobile device, an internal operating condition of the mobile device, or an external environment of the mobile device.

21. The non-transitory computer-readable medium of claim 16, wherein the information related to facilitating the proposed financial transaction includes information authenticating a user of the mobile device as an authorized party to the proposed financial transaction.

22. The non-transitory computer-readable medium of claim 16, wherein the information related to facilitating the proposed financial transaction includes information authenticating the mobile device as an authorized transacting element in the proposed financial transaction.

23. The non-transitory computer-readable medium of claim 16, wherein the proposed financial transaction includes one of a point-of-sale transaction, an ATM transaction, or an electronic transfer of funds.

24. A method for autonomous service by a mobile device, comprising:

receiving, by a mobile device via wireless communication, a message serving as a request for information related to facilitating a proposed financial transaction;

autonomously servicing, by an agent of the mobile device, the message based at least in part on a service context of the mobile device;

conditionally handling, by the mobile device, the request for information by the autonomous servicing of the message, the information related to facilitating the proposed financial transaction being based at least in part on the autonomous servicing of the message; and providing, by the mobile device, the information related to facilitating the proposed financial transaction.

25. The method of claim 24, wherein the service context includes at least one of a current geographical location of the mobile device or a geographical location of the financial transaction, and is based on one or more of a user of the mobile device, an internal operating condition of the mobile device, or an external environment of the mobile device.

26. The method of claim 24, further comprising:
authenticating, by the mobile device, a user of the mobile device as an authorized party to the proposed financial transaction.

27. The method of claim 24,
wherein the source of the message includes a first apparatus;
wherein providing the information related to facilitating the proposed financial transaction includes providing, by the mobile device, to the first apparatus, first information authenticating a user of the mobile device as an authorized party to the proposed financial transaction;
wherein the method further comprises providing, by the mobile device, to a second apparatus different from the first apparatus, second information authenticating the user of the mobile device as an authorized party to the proposed financial transaction; and
wherein the second apparatus is a party to the proposed financial transaction.

28. The method of claim 24, further comprising:
collecting and storing, by the mobile device, data including an external environment of the mobile device;
wherein the service context includes at least one of a current geographical location of the mobile device or a geographical location of the proposed financial transaction, based on the stored data about the external environment of the mobile device.

29. The method of claim 28, wherein the collecting and storing of data comprises collecting, by the mobile device, at least some of the data using at least one sensor integrated with the mobile device.

30. The method of claim 28, wherein the proposed financial transaction includes one of a point-of-sale transaction, an ATM transaction, or an electronic transfer of funds.

* * * * *